3,748,173
INTUMESCENT COATED ARTICLES
Shirley H. Roth, Highland Park, N.J., assignor to Cities Service Company, New York, N.Y.
No Drawing. Filed Nov. 5, 1971, Ser. No. 196,229
Int. Cl. C09d 5/18; C09k 3/28
U.S. Cl. 117—136      9 Claims

ABSTRACT OF THE DISCLOSURE

Articles coated with intumescent compositions which comprise certain bis(aromatic sulfonamides) wherein the aromatic rings are linked by a divalent functional group, such as an oxy, thio, sulfinyl, sulfonyl, imino, ureido, thioureido, guanido, carbonate, phosphate, or alkylene group. The intumescent agents may be prepared by conventional techniques and may be employed in conjunction with conventional additives. Preferred intumescent agents are those in which two benzenesulfonamide groups are linked by an oxy, ureido, sulfonyl, or imino group.

BACKGROUND OF THE INVENTION

Field of the invention

This invention relates to intumescent compositions and more particularly relates to such compositions containing a one-component intumescent agent.

Description of the prior art

It is known that a substrate may be protected from heat and fire by the application of an intumescent composition. Intumescent compositions of the prior art usually contain an intumescent agent having at least three components, i.e., a carbonific, a spumific, and a catalyst; and they are typically characterized by the disadvantages of high cost, low spreading rate, relatively poor efficiency, poor water resistance, and poor weatherability.

As disclosed in U.S. Pat. 3,535,130, it has already been discovered that a one-component intumescent agent has advantages over multicomponent intumescent agents. However, the intumescent agents of the patent have poor adherence to substrates and have an undesirable degree of moisture sensitivity.

SUMMARY OF THE INVENTION

An object of this invention is to provide a novel class of one-component intumescent agents.

Another object is to provide such intumescent agents having good efficiency and a low level of moisture sensitivity.

These and other objects are attained by using as intumescent agents compounds corresponding to the formula:

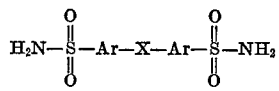

wherein Ar is a divalent aromatic residue and X is a divalent functional group.

DESCRIPTION OF THE PREFERRED EMBODIMENTS

The compound used as intumescent agents in accordance with the invention may be any compounds corresponding to the above formula. Thus, Ar may be a divalent radical derived from an aromatic hydrocarbon or a substituted aromatic hydrocarbon bearing up to three substituents, such as sulfonamido, chloro, bromo, nitro, etc.; and X may be any divalent functional group, e.g., an oxy, thio, sulfinyl, sulfonyl, imino, ureido, thioureido, guanido, carbonate, phosphate, or alkylene group. Substituents on the aromatic rings are sometimes advantageous, e.g., to impart flame retardance or other desirable property; but, except for sulfonamido groups, they usually decrease the degree to which the compounds intumesce. Therefore, when the degree of intumescence is of paramount importance, the preferred compounds are those wherein Ar is a divalent aromatic hydrocarbon residue, e.g., a residue derived from benzene or naphthalene, or a divalent sulfonamido-substituted derivative thereof. The sulfonamide groups may be ortho, meta, or para to the divalent functional group, preferably ortho or para.

Exemplary of the intumescent agents of the invention are p,p'-oxybis(benzenesulfonamide),
p,p'-oxybis(2,5-dibromobenzenesulfonamide),
p,p'-oxybis(2-chlorobenzenesulfonamide),
p,p'-oxybis(2-nitrobenzenesulfonamide),
p,p'-oxybis(2-sulfonamidobenzenesulfonamide),
p,p'-methylenebis-(benzenesulfonamide),
p,p'-ethylenebis(benzenesulfonamide),
p,p'-propylenebis(benzenesulfonamide),
p,p'-butylenebis(benzenesulfonamide),
p,p'-thiobis(benzenesulfonamide),
p,p'-sulfinylbis(benzenesulfonamide),
p,p'-sulfonylbis(benzenesulfonamide),
p,p'-iminobis(benzenesulfonamide),
p,p'-ureidobis(benzenesulfonamide),
p,p'-thioureidobis(benzenesulfonamide),
p,p'-guanidobis(benzenesulfonamide),
p,p'-carbonatobis(benzenesulfonamide),
p,p'-phosphatobis(benzenesulfonamide), the corresponding o,o'- and m,m'-bis(benzenesulfonamides), and the corresponding bis(naphthalenesulfonamides). The preferred intumescent agents are p,p'-oxybis(benzenesulfonamide), o,o' - oxybis(benzenesulfonamide), p,p'-ureidobis(benzenesulfonamide), o,o'-ureidobis(benzenesulfonamide), m,m' - sulfonylbis(benzenesulfonamide), p,p'-iminobis(benzenesulfonamide), and o,o'-iminobis(benzenesulfonamide).

When not commercially available, the intumescent agents may be prepared by treating the appropriate compound corresponding to the formula H—Ar—X—Ar—H with chlorosulfonic acid and converting the resultant sulfonyl chloride to the sulfonamide, essentially as taught in Ernest H. Huntress and Frederick H. Carten, "Identification of Organic Compounds, III, Chlorosulfonic Acid as a Reagent for the Characterization of Aromatic Ethers," Journal of the American Chemical Society, vol. 62, pp. 603–604 (1940).

For use in protecting a substrate from heat and fire, the intumescent agents of the invention may be applied in any suitable manner, e.g., electrodeposition, spraying of powdered intumescent agent onto an adhesive substrate, etc. However, it is usually preferred to compound the intumescent agent with a binder, e.g., nitrocellulose, and optionally also with one or more of the other ingredients conventionally used in intumescent compositions, e.g., stabilizers, dispersing agents, pigments, driers, biocides, anti-foamers, thickeners, protective colloids, fillers, blowing agents, etc.; disperse the composition in a suitable liquid medium, e.g., water or a solvent or solvent mixture; and apply the coating composition thus formed to the substrate to be protected. As is the case with conventional intumescent coating compositions, it is frequently convenient to apply these coating compositions in the form of a paint having a solids content of about 10–70% by weight and an intumescent agent/binder weight ratio of about 0.075–14/1 to deposit a coating having a dry thickness of about 0.001–0.75 inch. Coating compositions comprising certain preferred intumescent agent-binder combinations are disclosed and claimed in copending application S.N. 196,230, filed Nov. 5, 1971, now U.S. Pat. No. 3,703,487, in the names of Joseph Green, Shirley H. Roth, and John J. Seipel.

The intumescent agents of the invention are efficient, have low moisture sensitivity, and intumesce to form foams having good volume, cell structure, and adherence to substrates, such as wood, metal, and plastics. They are also useful as flame retardants in normally flammable compositions.

The following examples are given to illustrate the invention and are not intended as a limitation thereof. Unless otherwise specified, parts mentioned are parts by weight.

EXAMPLE I

Place one gram of p,p'-oxybis(benzenesulfonamide) in an aluminum pan and flame it with a propane torch. The compound intumesces to form an excellent volume of foam having a good cell structure. The compound has a solubility of only 0.04 g./100 g. of water at 20° C.

EXAMPLE II

Ball mill a mixture of 84 parts of p,p'-oxybis(benzenesulfonamide), 27 parts of a vinyl chloride/vinylidene chloride copolymer, 6 parts of titanium dioxide, 105 parts of methyl ethyl ketone, and 3 parts of suspending agent to form a coating composition. Apply the composition to four poplar test panels to form films having a dry thickness of 0.024 inch. Test the panels in accordance with the two-foot tunnel test described in H. L. Vandersall, "The Use of a Small Flame Tunnel for Evaluating Fire Hazard," Journal of Paint Technology, Vol. 39, No. 511, pp. 494–500 (1967). The panels have an average flame spread rating of 10, an average degree of intumescence of 19 mm., and an average insulative value of 90° C.

EXAMPLE III

Repeat Example II except for substituting o,o'-oxybis (benzenesulfonamide), p,p' - ureidobis(benzenesulfonamide), o,o'-ureidobis(benzenesulfonamide), m,m' - sulfonyl-bis(benzenesulfonamide), p,p'-iminobis(benzenesulfonamide), and o,o'-iminobis(benzenesulfonamide), respectively, for the p,p' - oxybis(benzenesulfonamide). Similar results are observed.

Similar results are also observed when the other intumescent agents mentioned in the specification are substituted for the intumescent agents of the examples.

It is obvious that many variations may be made in the products and processes set forth above without departing from the spirit and scope of this invention.

What is claimed is:
1. An article comprising a substrate coated with an intumescent agent corresponding to the formula:

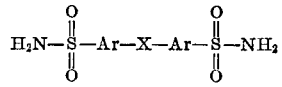

wherein Ar is a divalent aromatic residue and X is a divalent functional group.

2. The article of claim 1 wherein Ar is a divalent aromatic hydrocarbon residue derived from benzene or naphthalene, or a divalent sulfonamido-substituted derivative thereof.

3. The article of claim 1 wherein X is a divalent functional group selected from oxy, thio, sulfinyl, sulfonyl, imino, ureido, thioureido, guanido, carbonate, phosphate, and alkylene groups.

4. The article of claim 1 wherein the intumescent agent is p,p'-oxybis(benzenesulfonamide).

5. The article of claim 1 wherein the intumescent agent is o,o'-oxybis(benzenesulfonamide).

6. The article of claim 1 wherein the intumescent agent is p,p'-ureidobis(benzenesulfonamide).

7. The article of claim 1 wherein the intumescent agent is o,o'-ureidobis(benzenesulfonamide).

8. The article of claim 1 wherein the intumescent agent is m,m'-sulfonylbis(benzenesulfonamide).

9. The article of claim 1 wherein the intumescent agent is p,p'- or o,o'-iminobis(benzenesulfonamide).

References Cited

UNITED STATES PATENTS

| | | | |
|---|---|---|---|
| 3,535,130 | 10/1970 | Webb | 117—136 X |
| 2,671,771 | 3/1954 | Simons | 260—18 X |
| 3,179,634 | 4/1965 | Edwards | 117—136 X |
| 3,234,190 | 2/1966 | Tashlick | 156—331 X |

FOREIGN PATENTS

| | | | |
|---|---|---|---|
| 500,607 | 2/1939 | Great Britain | 260—556 |
| 121,764 | 7/1946 | Australia | 260—556 |

OTHER REFERENCES

Huntress et al., Jour. of Amer. Chem. Soc., vol. 62, pp. 603–604 (1940).

Chem. Abs., vol. 72, No. 4262w (1970).

WILLIAM D. MARTIN, Primary Examiner

H. J. GWINNELL, Assistant Examiner

U.S. Cl. X.R.

106—15 FP